United States Patent
Jeong

(10) Patent No.: US 12,233,686 B2
(45) Date of Patent: Feb. 25, 2025

(54) HEAT PUMP SYSTEM FOR VEHICLE

(71) Applicants: Hyundai Motor Company, Seoul (KR); Kia Corporation, Seoul (KR)

(72) Inventor: Seong-Bin Jeong, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 326 days.

(21) Appl. No.: 17/865,724

(22) Filed: Jul. 15, 2022

(65) Prior Publication Data

US 2023/0173884 A1 Jun. 8, 2023

(30) Foreign Application Priority Data

Dec. 6, 2021 (KR) ...................... 10-2021-01713118

(51) Int. Cl.
*B60H 1/00* (2006.01)
(52) U.S. Cl.
CPC ..... *B60H 1/00914* (2013.01); *B60H 1/00278* (2013.01); *B60H 1/00392* (2013.01); *B60H 1/00878* (2013.01); *B60H 2001/00928* (2013.01)
(58) Field of Classification Search
CPC ...... B60H 2001/00928; B60H 1/00914; B60H 1/00278; B60H 1/00392; B60H 1/0087
See application file for complete search history.

(56) References Cited

U.S. PATENT DOCUMENTS

| | | | |
|---|---|---|---|
| 8,753,762 B2 | 6/2014 | Major et al. | |
| 2012/0031140 A1* | 2/2012 | Zhang | F25D 16/00 62/498 |
| 2021/0001688 A1* | 1/2021 | Kim | B60H 1/143 |
| 2021/0129627 A1* | 5/2021 | Kim | B60H 1/00278 |
| 2021/0138867 A1* | 5/2021 | Kim | B60H 3/024 |
| 2022/0349627 A1* | 11/2022 | Lee | B60H 1/32284 |
| 2023/0415547 A1* | 12/2023 | Tanabe | B60H 1/3205 |

FOREIGN PATENT DOCUMENTS

KR 10-2019-0033115 A 3/2019

OTHER PUBLICATIONS

Taekkyu Lim et al. entitled "Evaluation of Performance of Cabin Heating and Battery Warm-Up Using Inductor Heater"—KSAE 2019 Annual Spring Conference; p. 1158.

* cited by examiner

*Primary Examiner* — Gordon A Jones
(74) *Attorney, Agent, or Firm* — Morgan, Lewis & Bockius LLP

(57) ABSTRACT

A heat pump system for a vehicle controls a temperature of a battery module by use of one chiller in which a coolant and a refrigerant are heat-exchanged and that improves heating efficiency by recovering heat from various heat sources in a heating mode of a vehicle to use them for indoor heating, including: a valve, an electrical component cooling device, a battery cooling device, an indoor heating device, an indoor cooling device, a centralized energy device, and a chiller, wherein a condenser included in the centralized energy device is connected to the second line through the second valve to condense the refrigerant supplied through the refrigerant line through heat-exchange with the coolant and is provided in a sixth line through which the coolant flows; and a first end portion of the third line is connected to a third valve provided in the sixth line.

18 Claims, 7 Drawing Sheets

100

100

100

100

HEAT PUMP SYSTEM FOR VEHICLE

CROSS-REFERENCE TO RELATED APPLICATION

The present application claims priority to Korean Patent Application No. 10-2021-0173118 filed on Dec. 6, 2021, the entire contents of which is incorporated herein for all purposes by this reference.

BACKGROUND OF THE PRESENT DISCLOSURE

Field of the Present Disclosure

The present disclosure relates to a heat pump system for a vehicle. More particularly, the present disclosure relates to a heat pump system for a vehicle which may control a temperature of a battery module by selectively using a chiller in which a refrigerant and a coolant are heat-exchanged, and which may cool or heat an interior of a vehicle by selectively using a high-temperature coolant and a low-temperature coolant.

Description of Related Art

Generally, an air conditioner system for a vehicle includes an air conditioner for circulating a refrigerant to heat or cool an interior of the vehicle.

The air conditioner system, which may maintain a fresh indoor condition by maintaining an indoor temperature of a vehicle at an appropriate temperature regardless of an outdoor temperature change, is configured to heat or cool an interior of the vehicle by heat-exchange by a condenser and an evaporator during a process in which a refrigerant discharged by driving a compressor is circulated to the compressor again by passing through the condenser, a receiver drier, an expansion valve, and the evaporator.

That is, in the air conditioner system, a high-temperature and high-pressure gaseous refrigerant compressed by the compressor is condensed through the condenser, then is evaporated by the evaporator through the receiver drier and the expansion valve to lower the indoor temperature and humidity in a summer cooling mode.

Recently, as a concern about energy efficiency and environmental pollution has gradually increased, development of an environment-friendly vehicle configured for being substantially substituted for a vehicle having an internal combustion engine has been required, and the environment-friendly vehicles are typically classified into an electric vehicle which is typically driven using a fuel cell or electricity as a power source, and a hybrid vehicle which is driven using an engine and an electric battery.

In the electric vehicle and the hybrid vehicle of the environment-friendly vehicles, a separate heater is not used, unlike an air conditioner of a general vehicle, and an air conditioner, which is applied to the environment-friendly vehicle, is typically referred to as a heat pump system.

In a case of the electric vehicle using the fuel cell, chemical reaction energy of oxygen and hydrogen is converted into electrical energy to generate driving force, and during the present process, thermal energy is generated by chemical reaction in the fuel cell, and as a result, effective removal of the generated heat is required to secure the performance of the fuel cell.

Even in the hybrid vehicle, the driving force is generated by driving the motor by use of electricity supplied from the fuel cell or the electric battery together with the engine which is actuated with a general fuel, and as a result, the performance of the motor may be secured only by effectively removing the heat generated from the fuel cell or the battery, and the motor.

Accordingly, in a hybrid vehicle or electric vehicle of a related art, a battery cooling system, a cooling portion, and a heat pump system may be configured to have respective separate circuits to prevent heat generation of a motor, an electrical component, and a battery including a fuel cell.

Thus, a size and a weight of a cooling module provided in the front of the vehicle are increased, and a layout of connecting pipes for respectively supplying a refrigerant or coolant to the heat pump system, the cooling device, and the battery cooling system inside an engine compartment becomes complicated.

Furthermore, because the battery cooling system for heating or cooling the battery is separately provided according to a state of the vehicle so that the battery may operate in an optimal state, a plurality of valves for connecting the respective connecting pipes are applied, thus noise and vibration are transmitted to the interior of the vehicle, resulting in poor ride comfort.

Furthermore, when heating the interior of the vehicle, the heating performance decreases due to a lack of a heat source, the amount of electricity consumption increases due to the use of an electric heater, and the power consumption of the compressor increases.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a heat pump system for a vehicle which may control a temperature of a battery module by use of one chiller in which a coolant and a refrigerant are heat-exchanged and which may improve heating efficiency by recovering heat from various heat sources in a heating mode of a vehicle and using it for indoor heating.

Various aspects of the present disclosure are directed to providing a heat pump system for a vehicle, including: an electrical component cooling device including a radiator and a first water pump that are provided in a first line, and circulating a coolant in the first line to cool at least one electrical component provided in the first line; a battery cooling device including a second water pump and a battery module that are provided in a second line, and circulating a coolant in the battery module; an indoor heating device including a third water pump and a heater that are provided in a third line to heat a vehicle interior by use of a high-temperature coolant; an indoor cooling device including a fourth water pump and a cooler that are interconnected through a fourth line to cool the vehicle interior by use of a low-temperature coolant; a centralized energy (CE) device in which, to supply a high-temperature coolant to the indoor heating device and a low-temperature coolant to the indoor cooling device, thermal energy generated during condensation and evaporation of a refrigerant circulating in a refrigerant line is exchanged with an introduced coolant to control a temperature of the coolant; and a chiller that is connected to a refrigerant connection line connected to the refrigerant line, is provided in a fifth line connected to the first line and the second line through a first valve and a second valve, respectively, and controls a temperature of the coolant by heat-exchanging a selectively introduced coolant with the refrigerant, wherein a condenser included in the centralized energy device is connected to the second line through the second valve to condense the refrigerant supplied through the refrigerant line through heat-exchange with the coolant and is provided in a sixth line through which the coolant flows; and a first end portion of the third line is connected to a third valve provided in the sixth line.

The centralized energy device may include: a first expansion valve connected to the condenser and the refrigerant line; an evaporator that is connected to the first expansion valve through the refrigerant line, is connected to the fourth line, and evaporates the refrigerant through heat-exchange of the refrigerant and the coolant and simultaneously decreases a temperature of the coolant; a compressor provided in the refrigerant line between the evaporator and the condenser; and an accumulator provided in the refrigerant line between the evaporator and the compressor, wherein one end portion of the refrigerant connection line may be connected to the refrigerant line that connects the condenser and the first expansion valve, and the other end portion of the refrigerant connection line may be connected to the refrigerant line between the evaporator and the accumulator.

The first line may be selectively connectable to the sixth line through the first valve, the other end portion of the third line may be connected to the sixth line at a position which the first line and the sixth line cross, and the first line connected to the radiator may be connected to the third valve through a radiator connection line connecting the first line and the third valve.

The heat pump system for the vehicle may further include: a supply line in which a first end portion thereof is connected to the third line and a second end portion thereof is selectively connectable to the second line through a fourth valve; a fifth valve provided between the first line and the fifth line so that the fifth line and the first line that are connected to the chiller are selectively connectable via operation of the fifth valve; a bypass line selectively connecting the first line connected to the first water pump through an operation of the fifth valve so that the coolant circulates to the at least one electrical component without passing through the radiator; a first branch line selectively connecting the first valve and the fourth valve; and a second branch line selectively connecting the fourth valve and the fifth valve.

When the battery module is cooled in a cooling mode of the vehicle, in the electrical component cooling device, the first water pump may be operated; the first branch line may be closed by operation of the first valve, and the first line connected to the sixth line may be opened; the sixth line and the radiator connection line may be opened by operation of the third valve, and the third line may be closed; the coolant may circulate through the radiator, the at least one electrical component, and the condenser along the opened first line, a portion of the sixth line, and the radiator connection line; in the battery cooling device, the second water pump may be operated; the second line and the fifth line may be connected by operation of the second valve, and a portion of the sixth line connected to the second valve may be closed; the first branch line may be closed by operation of the first valve and the fourth valve; the second branch line may be opened by operations of the fourth valve and the fifth valve; the coolant that has passed through the battery module may pass through the chiller along the fifth line from the second line, and then may circulate along the second line, the fifth line, and the second branch line that are opened while flowing back into the second line through the second branch line; in the centralized energy device, each constituent element thereof may operate so that a refrigerant circulates along the refrigerant line; in the indoor cooling device, the fourth water pump may be operated so that a coolant may be circulated along the fourth line connecting the evaporator and the cooler to supply the coolant that has passed through the evaporator provided in the centralized energy device to the cooler.

When the at least one electrical component and the battery module are cooled by use of a coolant cooled in the radiator in a cooling mode of the vehicle, in the electrical component cooling device and the battery cooling device, the first and second water pumps may be operated, respectively; a portion of the first line connecting the first valve and the sixth line may be closed by operation of the first valve; the fifth line may be closed, and simultaneously, the first branch line may be opened, by operation of the first valve; the second line connected to the battery module may be connected to the first branch line, and the supply line may be closed, by operation of the fourth valve; in a state in which the fifth line is closed by operation of the second valve, the sixth line may be opened; in a state in which the third line is closed by operation of the third valve, the radiator connection line may be connected to the first line connected to the radiator; a coolant cooled in the radiator may sequentially pass through the at least one electrical component, the battery module, and the condenser along the first line, the first branch line, the second line, the sixth line, and the radiator connection line that are opened to flow into the radiator; in the centralized energy device, each constituent element thereof may operate so that a refrigerant may circulate along the refrigerant line; and in the indoor cooling device, the fourth water pump may be operated so that a coolant may be circulated along the second connection line connecting the evaporator and the cooler to supply the coolant that has passed through the evaporator provided in the centralized energy device to the cooler.

When recovering heat from an external heat source and increasing a temperature of the battery module in a heating mode of the vehicle, in the electrical component cooling device and the battery cooling device, the first and second water pumps may be operated, respectively; in the indoor heating device, the third water pump may be operated; the first line may be connected to the fifth line and the first branch line may be closed by operation of the first valve; a portion of the first line connecting the first valve and the sixth line may be closed by operation of the first valve; in a state in which the bypass line is closed by operation of the fifth valve, the first line connected to the radiator may be opened, and the fifth line and the first line may be connected; the coolant that has passed the at least one electrical component may pass through the chiller along the first line and the fifth line that are opened, and then may recover heat from a heat source from outside air while again passing through the radiator along the opened first line; the fifth line connected to the second valve may be closed and the second line may be connected to the sixth line through the second valve by operation of the second valve; in a state in which the radiator connection line is closed by operation of the third valve, the third line may be opened; the supply line and the second line may be connected by operation of the fourth valve; the second branch line may be closed by operations of the fourth valve and the fifth valve; a coolant that has passed through the battery module may pass through the condenser along the second line and the sixth line that are opened, and then may be supplied to the heater along the opened third line; a coolant that has passed through the heater may flow back into the condenser along the third line and the sixth line; some of the coolant that has passed through the condenser may be circulated while flowing back into the battery module along the supply line and the second line that are opened; and in the centralized energy device, each constituent element thereof may operate so that a refrigerant may circulate along the refrigerant line.

When recovering waste heat of the at least one electrical component and increasing a temperature of the battery module in a heating mode of the vehicle, in the electrical component cooling device and the battery cooling device, the first and second water pumps may be operated, respectively; in the indoor heating device, the third water pump may be operated; the first line may be connected to the fifth line and the first branch line may be closed by operation of the first valve; a portion of the first line connecting the first valve and the sixth line may be closed by operation of the first valve; in a state in which the first line connected to the radiator closed by operation of the fifth valve, the bypass line may be opened; the fifth line and the opened bypass line may be connected by operation of the fifth valve; a coolant that has passed through the at least one electrical component may pass through the chiller along the first line and the fifth line that are opened, and then may be heated by waste heat of the at least one electrical component while passing through the at least one electrical component without passing through the radiator along the opened bypass line; the fifth line connected to the second valve may be closed and the second line may be connected to the sixth line through the second valve by operation of the second valve; in a state in which the radiator connection line is closed by operation of the third valve, the third line may be opened; the supply line and the second line may be connected by operation of the fourth valve; the second branch line may be closed by operations of the fourth valve and the fifth valve; a coolant that has passed through the battery module may pass through the condenser along the second line and the sixth line that are opened, and then may be supplied to the heater along the opened third line; a coolant that has passed through the heater may flow back into the condenser along the third line and the sixth line; some of the coolant that has passed through the condenser may be circulated while flowing back into the battery module along the supply line and the second line that are opened; and in the centralized energy device, each constituent element thereof may operate so that a refrigerant may circulate along the refrigerant line.

The chiller may increase a temperature of a coolant by heat-exchanging a coolant and a refrigerant to recover waste heat from the coolant heated while passing through the at least one electrical component.

When recovering heat from an external heat source and recovering waste heat of the battery module in a heating mode of the vehicle, in the electrical component cooling device and the battery cooling device, the first and second water pumps may be operated, respectively; in the indoor heating device, the third water pump may be operated; the fifth line connected to the first line may be closed and the first branch line may be opened by operation of the first valve; a portion of the first line connecting the first valve and the sixth line may be closed by operation of the first valve; the second line connected to the battery module may be connected to the first branch line, and the supply line may be closed, by operation of the fourth valve; the second line may be connected to the fifth line and a portion of the sixth line connected to the second line may be closed by operation of the second valve; in a state in which the bypass line is closed by operation of the fifth valve, the first line connected to the radiator may be opened, and the fifth line and the first line may be connected; the second branch line may be closed by operations of the fourth valve and the fifth valve; a coolant that has passed through the at least one electrical component may sequentially pass through the battery module and the chiller along the first line, the first branch line, the second line, and the fifth line that are opened, and then may recover heat from a heat source from outside air while passing through the radiator along the opened first line again; in a state in which the radiator connection line is closed by operation of the third valve, the third line may be opened; a coolant that has passed through the condenser along the opened sixth line may be supplied to the heater along the third line; a coolant that has passed through the heater may be circulated while flowing back into the condenser along the third line and the opened sixth line; and in the centralized energy device, each constituent element thereof may operate so that a refrigerant may circulate along the refrigerant line.

When recovering waste heat of the at least one electrical component and the battery module in a heating mode of the vehicle, in the electrical component cooling device and the battery cooling device, the first and second water pumps may be operated, respectively; in the indoor heating device, the third water pump may be operated; the fifth line connected to the first line may be closed and the first branch line may be opened by operation of the first valve; a portion of the first line connecting the first valve and the sixth line may be closed by operation of the first valve; the second line connected to the battery module may be connected to the first branch line, and the supply line may be closed, by operation of the fourth valve; the second line may be connected to the fifth line and a portion of the sixth line connected to the second line may be closed by operation of the second valve; in a state in which the first line connected to the radiator is closed by operation of the fifth valve, the bypass line may be opened; the fifth line and the opened bypass line may be connected by operation of the fifth valve; the second branch line may be closed by operations of the fourth valve and the fifth valve; a coolant that has passed through the at least one electrical component may pass through the chiller along the first line, the first branch line, the second line, and the fifth line that are opened, and then may be heated by the waste heat of the at least one electrical component and the battery module while passing through the at least one electrical component and the battery module without passing through the radiator along the opened bypass line; in a state in which the radiator connection line is closed by operation of the third valve, the third line may be opened; a coolant that has passed through the condenser along the opened sixth line may be supplied to the heater along the third line; a coolant that has passed through the heater may be circulated while flowing back into the condenser along the third line and the opened sixth line; and in the centralized energy device, each constituent element thereof may operate so that a refrigerant may circulate along the refrigerant line.

The first, fourth, and fifth valves may be four-way valves, and the second and third valves may be three-way valves.

At a front end portion of the chiller, the refrigerant connection line may be provided with a second expansion valve to control flow of the refrigerant flowing into the chiller and to selectively expand the refrigerant.

The second expansion valve may expand the refrigerant flowing into the refrigerant connection line to flow it into the chiller, when cooling the battery module by use of a coolant heat-exchanged with the refrigerant or when selectively recovering waste heat from the at least one electrical component and the battery module.

The first expansion valve and the second expansion valve may be electronic expansion valves that selectively expand a refrigerant while controlling flow of the refrigerant.

When dehumidification is required in a heating mode of the vehicle, the fourth water pump provided in the indoor cooling device may be operated, and a refrigerant may be supplied to the evaporator in the centralized energy device.

The indoor heating device may further include a coolant heater provided in the third line between the third valve and the third water pump.

The coolant heater may be operated when a temperature of a coolant supplied to the heater in a heating mode of the vehicle is lower than a target temperature or when the battery module is heated.

The chiller may recover waste heat generated from the at least one electrical component or the battery module or may control a temperature of the battery module, according to a cooling mode or a heating mode of the vehicle.

As described above, according to the heat pump system for the vehicle according to the exemplary embodiment of the present disclosure, simplification of the system may be realized, by use of one chiller in which a refrigerant and a coolant are heat-exchanged in an electric vehicle to control a temperature of a battery module according to a vehicle mode.

Furthermore, according to the exemplary embodiment of the present disclosure, it is possible to improve heating efficiency by selectively recovering waste heat generated from an external heat source, an electrical component, or a battery module in a heating mode of a vehicle to use it for indoor heating.

Furthermore, according to the exemplary embodiment of the present disclosure, by selectively heat-exchanging thermal energy generated from a refrigerant during condensation and evaporation of the refrigerant with a coolant, and by controlling an indoor temperature of a vehicle by respectively using the heat-exchanged low- or high-temperature coolant, it is possible to simplify a system and simplify a layout of a connecting pipe through which the refrigerant is circulated.

Furthermore, according to the exemplary embodiment of the present disclosure, by efficiently controlling a temperature of a battery module, it is possible to operate the battery module at optimal performance, and a total mileage of a vehicle may be increased through efficient management of the battery module.

Furthermore, according to the exemplary embodiment of the present disclosure, by modularizing a centralized energy device that generates thermal energy through condensation and evaporation of a refrigerant, and by use of a high-performance refrigerant, it is possible to reduce a size and weight thereof, and it is possible to further prevent noise, vibration, and operational instability from occurring compared to conventional air conditioners.

Furthermore, according to the exemplary embodiment of the present disclosure, by use of a coolant heater applied to an indoor heating device, it is possible to use the coolant heater as an auxiliary device for indoor heating, reducing cost and weight.

Furthermore, according to the exemplary embodiment of the present disclosure, it is possible to reduce manufacturing cost and weight through simplification of an entire system, and to improve space utilization.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
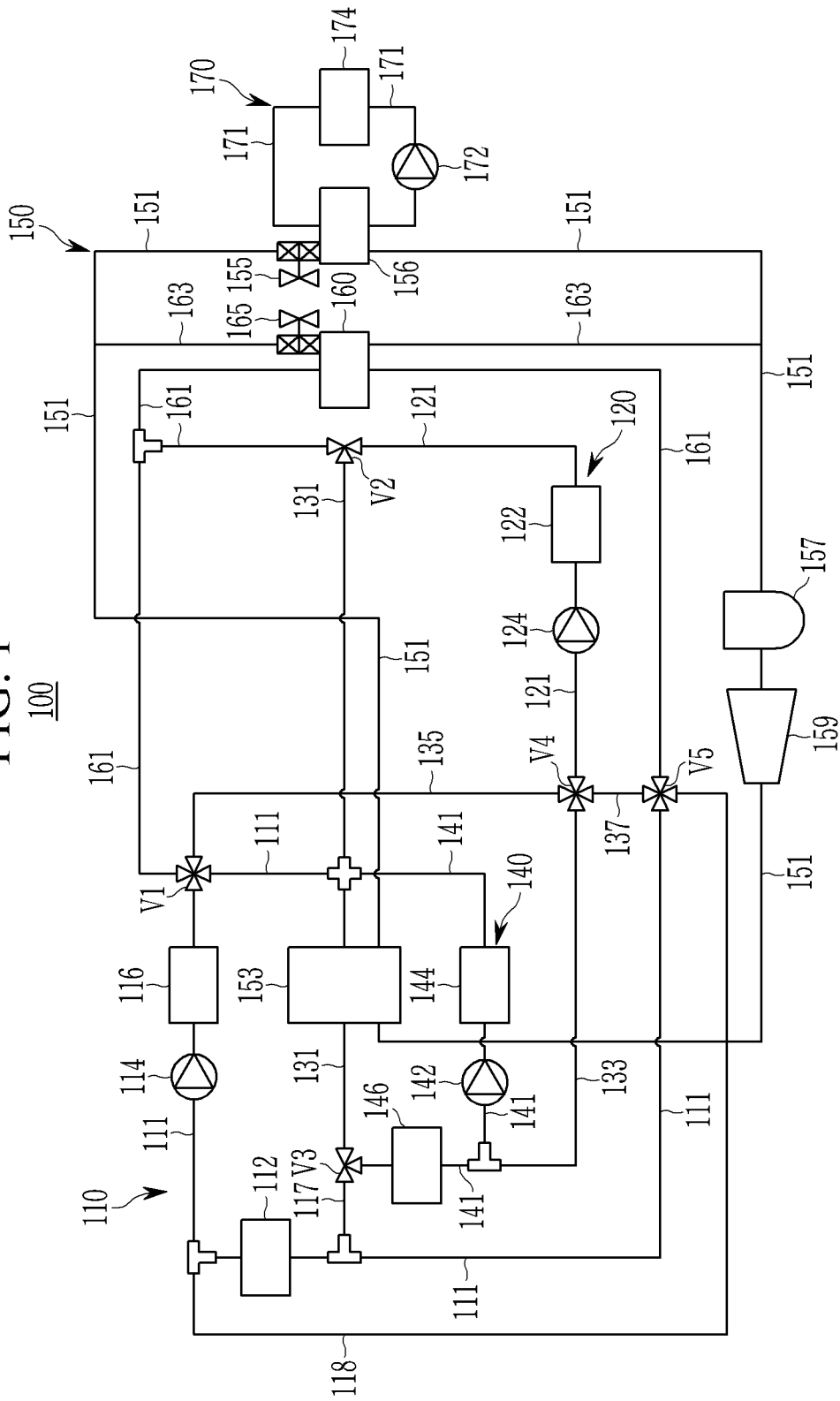
FIG. 1 illustrates a block diagram of a heat pump system for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Because the exemplary embodiment described in the specification and the configurations shown in the drawings are merely the most preferable embodiment and configurations of the present disclosure, they do not represent all of the technical ideas of the present disclosure, and it should be understood that various equivalents and modified examples, which may replace the embodiments, are possible when filing the present application.

To clearly describe the present disclosure, parts that are irrelevant to the description are omitted, and identical or similar constituent elements throughout the specification are denoted by the same reference numerals.

Because the size and thickness of each configuration shown in the drawings are arbitrarily shown for convenience of description, the present disclosure is not necessarily limited to configurations illustrated in the drawings, and to clearly illustrate several parts and areas, enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration including at least one function or operation.

FIG. 1 illustrates a block diagram of a heat pump system for a vehicle according to various exemplary embodiments of the present disclosure.

A heat pump system 100 for a vehicle according to various exemplary embodiments of the present disclosure selectively utilizes a chiller 160 in which a refrigerant and a coolant are heat-exchanged to control a temperature of a battery module 122, and selectively utilizes a high-temperature coolant and a low-temperature coolant to cool or heat an interior of the vehicle.

Referring to FIG. 1, the heat pump system 100 according to the exemplary embodiment of the present disclosure includes an electrical component cooling device 110, a battery cooling device 120, an indoor heating device 140, an indoor cooling device 170, a centralized energy device 150 (hereinafter referred to as a CE device), and the chiller 160.

First, the electrical component cooling device 110 includes a radiator 112 and a first water pump 114 provided in a first line 111.

The radiator 112 is provided at the front of the vehicle, and a cooling fan is provided at the rear thereof, so that the coolant is cooled through an operation of the cooling fan and heat-exchange with the outside air.

The electrical component cooling device 110 may circulate a coolant in the first line 111 through an operation of the first water pump 114 to cool at least one electrical component 116 provided in the first line 111.

Here, the electrical component 116 may include one of a driving motor, a power control device, an inverter, an on-board charger (OBC), a controller, and an autonomous driving controller.

The driving motor, the power control device, the inverter, the controller, and the autonomous driving controller may be configured to generate heat while driving, and the OBC may generate heat when charging the battery module 122.

The electrical component cooling device 110 configured as described above circulates the coolant cooled by the radiator 112 along the first line 111 through operation of the first water pump 114, cooling the electrical component 116 to not overheat.

In an exemplary embodiment of the present disclosure, the battery cooling device 120 may include the battery module 122 and a second water pump 124 provided in the second line 121.

The battery cooling device 120 configured as described above may control a temperature of the battery module 122 by circulating the coolant in the battery module 122 through an operation of the second water pump 124.

In an exemplary embodiment of the present disclosure, the indoor heating device 140 may include a third water pump 142 and a heater 144 provided in a third line 141 to heat the interior of the vehicle by use of a high-temperature coolant.

The indoor heating device 140 as described above, when the interior of the vehicle is heated, may circulate the high-temperature coolant in the third line 141 through operation of the third water pump 142 so that the high-temperature coolant is supplied to the heater 144.

Accordingly, the high-temperature coolant may be supplied to the heater 144 along the third line 141.

That is, the indoor heating device 140 may heat the vehicle interior by supplying the high-temperature coolant to the heater 144 through operation of the third water pump 142 in the vehicle heating mode.

Meanwhile, the heater 144 may be provided in a heating, ventilation, and air conditioning (HVAC) module.

Here, a coolant heater 146 for selectively heating the coolant circulating in the third line 141 may be provided in the third line 141 between a third valve V3 to be described later and the third water pump 142.

The coolant heater 146 is turned on when the temperature of the coolant supplied to the heater 144 in the vehicle heating mode is lower than a target temperature to heat the coolant circulated in the third line 141, and the coolant including an increased temperature may be introduced into the heater 144.

Furthermore, the coolant heater 146 may be selectively operated even when the temperature of the battery module 122 is increased.

The coolant heater 146 may be an electric heater that operates according to supplying of power.

Meanwhile, in an exemplary embodiment of the present disclosure, it is referred to as an example that the coolant heater 146 is provided in the third line 141, but the present disclosure is not limited thereto, and instead of the coolant heater 146, an air heater for increasing the temperature of the outside air flowing into the interior of the vehicle may be applied.

The air heater may be provided at the rear of the heater 144 toward the interior of the vehicle in the HVAC module to selectively heat the outside air that has passed through the heater 144.

The indoor heating device 140 configured as described above may heat the vehicle interior by supplying the high-temperature coolant to the heater 144 through operation of the third water pump 142 in the vehicle heating mode.

In an exemplary embodiment of the present disclosure, the indoor cooling device 170 may include a fourth water pump 172 and a cooler 174 interconnected through a fourth line 171 to cool the interior of the vehicle by use of a low-temperature coolant.

The fourth line 171 may be connected to an evaporator 156 provided in the centralized energy device 150.

The indoor cooling device 170 configured as described above supplies the coolant whose temperature is decreased to the cooler 174 while being circulated in the fourth line 171 in the vehicle cooling mode, through operation of the fourth water pump 172, cooling the interior of the vehicle.

Here, the cooler 174 may be provided in the HVAC module.

On the other hand, the HVAC module is provided between the heater 144 and the cooler 174, and according to the cooling, heating, and dehumidifying modes of the vehicle, a door for controlling outside air passing through the cooler 174 to selectively flow into the heater 144 is provided therein.

That is, the door is opened so that the outdoor air that has passed through the cooler 174 flows into the heater 144 in the heating mode of the vehicle. In contrast, in the cooling mode of the vehicle, the door closes the heater 144 side so that the outdoor air which is cooled while passing through the cooler 174 directly flows into the vehicle.

In an exemplary embodiment of the present disclosure, the centralized energy device 150 (hereinafter referred to as a CE device) may be connected to the indoor heating device 140 and may be connected to the fourth line 171, to supply high-temperature cooling water to the indoor heating device 140 and low-temperature cooling water to the indoor cooling device 170.

The CE device 150 may exchange thermal energy generated during condensation and evaporation of the refrigerant circulating in the refrigerant line 151 with respective supplied coolants.

The refrigerant may be a high-performance R152-a, R744, or R290 refrigerant.

That is, the high-temperature coolant is supplied to the heater 144 through the third line 141, and the low-temperature coolant is supplied to the cooler 174 through the fourth line 171.

Here, the CE device 150 includes a condenser 153, a first expansion valve 155, an evaporator 156, an accumulator 157, and a compressor 159 that are connected through a refrigerant line 151.

First, the refrigerant is circulated in the condenser 153, and the condenser 153 may be provided in a sixth line 131 selectively connectable to the first line 111 or the second line 121.

That is, the condenser 153 may heat-exchange the coolant introduced through the sixth line 131 with the refrigerant to condense the refrigerant.

The first expansion valve 155 may be connected to the condenser 153 through the refrigerant line 151. The first expansion valve 155 is supplied with the refrigerant that has passed through the condenser 153 to expand it.

The evaporator 156 is connected to the first expansion valve 155 through the refrigerant line 151. The evaporator 156 may be connected to the fourth line 171 to cool the coolant circulating in the fourth line 171 in the indoor cooling device 170.

The evaporator 156 configured as described above may evaporate the refrigerant through heat-exchange of the refrigerant and the coolant, and at the same time, may decrease the temperature of the coolant.

Here, the coolant circulating in the indoor cooling device 170 may be supplied to the evaporator 156 along the fourth line 171 so that the evaporator 156 evaporates the refrigerant through heat-exchange with the coolant.

Accordingly, the evaporator 156 may cool the coolant circulating in the fourth line 171 in the vehicle cooling mode through heat-exchange with a low-temperature refrigerant evaporated therein, and may supply the low-temperature coolant to the cooler 174 through the fourth line 171.

Furthermore, the compressor 159 is provided in the refrigerant line 151 between the evaporator 156 and the condenser 153. The compressor 159 may compress a gaseous refrigerant discharged from the evaporator 156 and may supply the compressed refrigerant to the condenser 153.

Meanwhile, the accumulator 157 is provided in the refrigerant line 151 between the evaporator 156 and the compressor 159.

The accumulator 157 improves efficiency and durability of the compressor 159 by supplying only the gaseous refrigerant to the compressor 159.

Furthermore, the chiller 160 is connected to the centralized energy device 150 through a refrigerant connection line 163 so that the coolant is selectively circulated.

Furthermore, the chiller 160 may be provided in a fifth line 161 respectively connected to the first line and the second line 111 and 121 through a first valve and a second valve V1 and V2.

Accordingly, the chiller 160 may adjust the temperature of the coolant by heat-exchanging the coolant selectively flowing therein with the refrigerant.

That is, the chiller 160 may recover waste heat generated from the electrical component 116 or the battery module 122 or adjust the temperature of the battery module 122, according to the cooling mode or the heating mode of the vehicle.

Meanwhile, one end portion of the refrigerant connection line 163 may be connected to the refrigerant line 151 that connects the condenser 153 and the first expansion valve 155.

Furthermore, the other end portion of the refrigerant connection line 163 may be connected to the refrigerant line 151 between the evaporator 156 and the accumulator 157.

Here, in the refrigerant connection line 163 at a front end portion of the chiller 160, a second expansion valve 165 is provided to control the flow of the refrigerant flowing into the chiller 160 and to selectively expand the refrigerant.

When cooling the battery module 122 by use of the coolant heat-exchanged with the refrigerant, or selectively recovering the waste heat from the electrical component 116 and the battery module 122, the second expansion valve 165 may expand the refrigerant flowing into the refrigerant connection line 163 to flow it into the chiller 160.

The second expansion valve 165 expands the condensed refrigerant discharged from the condenser 153 to flow it into the chiller 160 in a state of lowering the temperature thereof, so that the temperature of the coolant passing through the inside of the chiller 160 may be further lowered.

That is, when the chiller 160 cools the battery module 122 by use of the coolant heat-exchanged with the refrigerant, the chiller 160 may decrease the temperature of the coolant passing through the inside of the chiller 160 by use of the supplied low-temperature refrigerant.

Accordingly, the coolant whose temperature is reduced while passing through the chiller 160 may flow into the battery module 122 to be more efficiently cooled.

Meanwhile, when dehumidification is required in the heating mode of the vehicle, the fourth water pump 172 provided in the indoor cooling device 170 may be operated, and the refrigerant expanded by the operation of the first expansion valve 155 may be supplied to the evaporator 156.

Accordingly, the cooler 174 is supplied with the low-temperature coolant that has heat-exchanged with the refrigerant in the evaporator 156, so that indoor dehumidification may be performed.

In the CE device 150 configured as described above, the condenser 153, the evaporator 156, and the chiller 160 may be a water-cooled heat exchanger into which a coolant flows.

Furthermore, the first expansion valve 155 and the second expansion valve 165 may be electronic expansion valves that selectively expand a refrigerant while controlling the flow of the refrigerant.

Meanwhile, in an exemplary embodiment of the present disclosure, the condenser 153 may be provided in the sixth line 131 including one end portion connected to the second valve V2.

Furthermore, the first line 111 may be selectively connectable to the sixth line 131 through the first valve V1.

In an exemplary embodiment of the present disclosure, one end portion of the third line 141 may be connected to the third valve V3 provided in the sixth line 131. Furthermore, the other end portion of the third line 141 may be connected to the sixth line 131 at a point where the first line 111 and the sixth line 131 cross each other.

Accordingly, the coolant may be introduced into the third line 141 by the operation of the third valve V3 in the vehicle heating mode.

Furthermore, the first line 111 connected to the radiator 112 may be connected to the third valve V3 through a radiator connection line 117.

Meanwhile, the heat pump system 100 may further include a bypass line 118, a supply line 133, a fifth valve V5, a first branch line 135, and a second branch line 137.

First, the bypass line 118 may selectively connect the first line 111 to the first water pump 114 through an operation of the fifth valve V5 provided in the first line 111 at a front end portion of the radiator 112 based on a flow direction of the coolant so that the coolant that has passed through the electrical component 116 is circulated back to the electrical component 116 without passing through the radiator 112.

That is, the bypass line 118 may be selectively opened through operation of the fifth valve V5 when the coolant temperature is raised by absorbing the waste heat generated from the electrical component 116.

One end portion of the supply line 133 is connected to one end portion of the third line 141. Furthermore, the other end portion of the supply line 133 may be connected to the second line 121 through the fourth valve V4.

The fifth valve V5 may selectively connect the fifth line 161 and the first line 111 connected to the rear end portion of the chiller 160 based on the flow direction of the coolant.

In an exemplary embodiment of the present disclosure, the first branch line 135 may connect the first valve V1 and the fourth valve V4. Furthermore, the second branch line 137 may connect the fourth valve V4 and the fifth valve V5.

The first and second branch lines 135 and 137 may be selectively opened or closed by operations of the first, fourth, and fifth valves V1, V4, and V5 according to the vehicle cooling or heating mode.

Here, the first, fourth, and fifth valves V1, V4, and V5 may be four-way valves, and the second and third valves V2 and V3 may be three-way valves.

Hereinafter, an operation and action of the heat pump system for the vehicle according to the exemplary embodiment of the present disclosure configured as described above will be described in detail with reference to FIG. 2 to FIG. 7.

First, an operation when the battery module is cooled according to the vehicle cooling mode in the heat pump system for the vehicle according to the exemplary embodiment of the present disclosure will be described with reference to FIG. 2.

Figure 2:
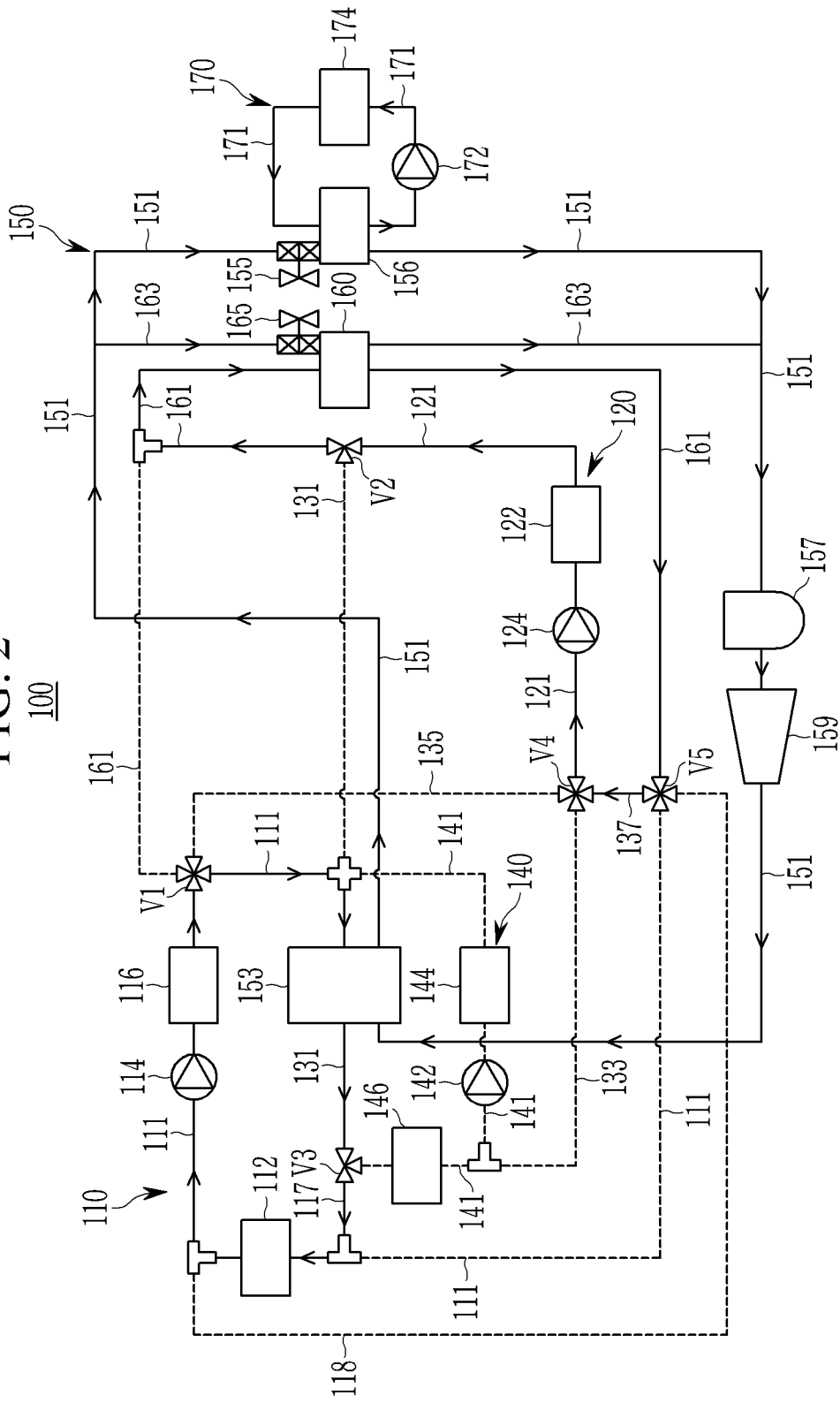
FIG. 2 illustrates an operational state diagram during battery module cooling according to a cooling mode in a heat pump system for a vehicle according to various exemplary embodiments of the present disclosure.

FIG. 2 illustrates an operational state diagram when the battery module cooled according to the cooling mode in the heat pump system for the vehicle according to the exemplary embodiment of the present disclosure.

Referring to FIG. 2, when the battery module 122 is cooled in the vehicle cooling mode, the coolant is circulated in the first line 111 by the operation of the first water pump 114 in the electrical component cooling device 110.

Here, the first line 111 connected to the sixth line 131 may be opened by the operation of the first valve V1.

Furthermore, the sixth line 131 and the radiator connection line 117 are opened by the operation of the third valve V3. In the instant case, the third line 141 may be closed by the operation of the third valve V3.

Accordingly, the coolant may be circulated in the radiator 112, the electrical component 116, and the condenser 153 along the opened first line 111, a portion of the sixth line 131, and the radiator connection line 117.

That is, the coolant cooled by the radiator 112 may cool the electrical component 116, and may be heat-exchanged with the refrigerant supplied to the condenser 153.

Furthermore, in the battery cooling device 120, the coolant is circulated in the battery coolant line 121 by the operation of the second water pump 124.

Here, the second line 121 and the fifth line 161 are connected by the operation of the second valve V2. Furthermore, a portion of the sixth line 131 connected to the second valve V2 may be closed.

Furthermore, the first branch line 135 may be closed by the operations of the first valve V1 and the fourth valve V4. The second branch line 137 may be opened by the operations of the fourth valve V4 and the fifth valve V5.

In the instant case, the supply line 133 may be closed by the operation of the fourth valve, and the bypass line 118 and a portion of the first line 111 connected to the fifth valve may be closed.

Accordingly, the coolant that has passed through the battery module 122 passes through the chiller 160 along the fifth line 161 from the second line 121. Accordingly, while the coolant that has passed through the chiller 160 flows again into the second line 121 through the second branch line 137, it may be circulated along the second line 121, the fifth line 161, and the second branch line 137 that are opened.

Here, in the CE device 150, respective constituent elements may operate so that the refrigerant may be circulated along the refrigerant line 151 to heat the vehicle interior.

In the instant case, the first and second expansion valves 155 and 165 may expand the refrigerant that has passed through the condenser 153 to supply it to the evaporator 156 and the chiller 160, respectively.

Accordingly, the coolant supplied through the fifth line 161 is cooled through heat-exchange with the low-temperature refrigerant supplied to the chiller 160.

The cooled coolant may efficiently cool the battery module 122 while circulating along the fifth line 161, and the second branch line 137 and the second line 121 that are opened.

Meanwhile, in the indoor cooling device 170, the fourth water pump 172 may be operated so that the coolant may be circulated along the fourth line 171 connecting the evaporator 156 and the cooler 174 to supply the coolant that has passed through the evaporator 156 to the cooler 174.

Here, the outside air flowing into the HVAC module is cooled while passing through the cooler 174 by the low-temperature coolant flowing into the cooler 174.

In the instant case, the door closes the portion passing through the heater 144 so that the cooled outside air does not pass through the heater 144. Therefore, the cooled outside air may directly flow into the interior of the vehicle.

Accordingly, the indoor cooling device 170 supplies the coolant whose temperature is decreased to the cooler 174 while being circulated in the fourth line 171 in the vehicle cooling mode, through operation of the fourth water pump 172, cooling the interior of the vehicle.

In an exemplary embodiment of the present disclosure, an operation for cooling the electrical component 116 and the battery module 122 by use of the coolant cooled by the radiator 112 in the vehicle cooling mode will be described with reference to FIG. 3.

Figure 3:
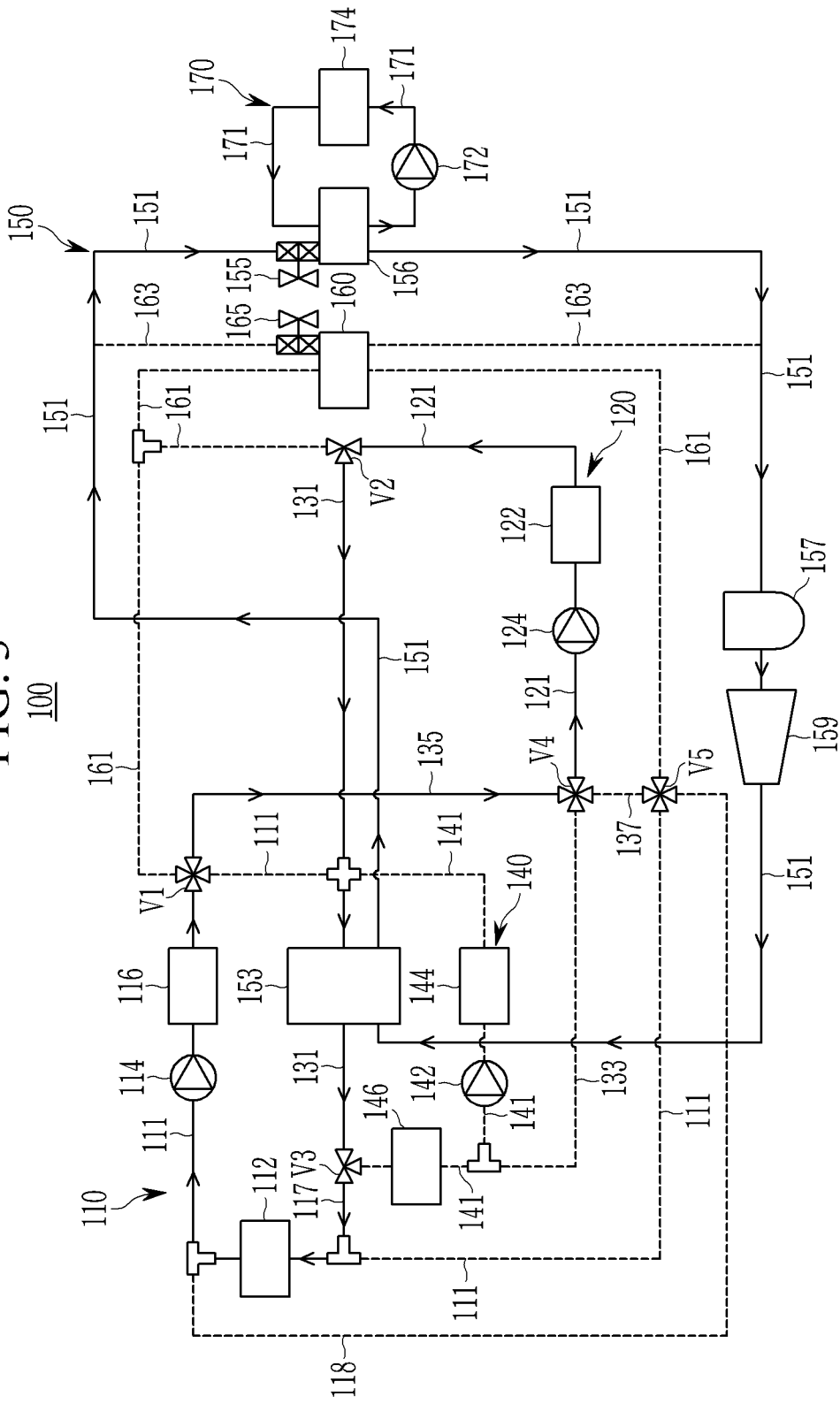
FIG. 3 illustrates an operational state diagram for cooling of an electrical component and a battery module using a coolant in a cooling mode in a heat pump system for a vehicle according to various exemplary embodiments of the present disclosure.

FIG. 3 illustrates an operational state diagram for cooling of an electrical component and a battery module using a coolant in a cooling mode in a heat pump system for a vehicle according to various exemplary embodiments of the present disclosure.

Referring to FIG. 3, the heat pump system 100 may cool the electrical component 116 and the battery module 122 by use of the coolant cooled by the radiator 112 in the vehicle cooling mode.

In the electrical component cooling device 110 and the battery cooling device 120, the first and second water pumps 114 and 124 are operated, respectively.

Here, the first valve V1 and a portion of the first line 111 for connecting the sixth line 131 are closed by the operation of the first valve V1.

Furthermore, the fifth line 161 is closed by the operation of the first valve V1, and simultaneously, the first branch line 135 is opened.

The second line 121 connected to the battery module 122 is connected to the first branch line 135 by the operation of the fourth valve V4, and the supply line 133 is closed.

The sixth line 131 may be opened in a state in which the fifth line 161 is closed by the operation of the second valve V2.

Furthermore, in a state in which the third line 141 is closed by the operation of the third valve V3, the radiator connection line 117 is connected to the first line 111 connected to the radiator 112.

Accordingly, the coolant cooled in the radiator 112 may sequentially pass through the electrical component 116, the battery module 122, and the condenser 153 along the first line 111, and the first branch line 135, the second line 121, the sixth line 131, and the radiator that are opened to flow into the radiator 112.

That is, the coolant cooled in the radiator 112 may circulate along the first line 111, the first branch line 135, and the second line 121 to cool the electrical component 116 and the battery module 122.

Accordingly, the coolant may be heat-exchanged with the refrigerant supplied to the condenser 153 while passing through the condenser 153 along the sixth line 131.

Here, in the CE device 150, respective constituent elements may operate so that the refrigerant may be circulated along the refrigerant line 151 to cool the interior of the vehicle.

In the instant case, the first expansion valve 155 expands the refrigerant that has passed through the condenser 153 to supply it to the evaporator 156, and the second expansion valve 165 does not operate. Accordingly, the supply of the refrigerant to the chiller 160 is stopped.

Accordingly, the coolant cooled in the radiator 112 circulates along the first line 111 and the second line 121 to efficiently cool the electrical component 116 and the battery module 122.

Meanwhile, in the indoor cooling device 170, the fourth water pump 172 may be operated so that the coolant may be circulated along the fourth line 171 connecting the evaporator 156 and the cooler 174 to supply the coolant that has passed through the evaporator 156 to the cooler 174.

Here, the outside air flowing into the HVAC module is cooled while passing through the cooler 174 by the low-temperature coolant flowing into the cooler 174.

In the instant case, the door closes the portion passing through the heater 144 so that the cooled outside air does not pass through the heater 144. Therefore, the cooled outside air may directly flow into the interior of the vehicle.

Accordingly, the indoor cooling device 170 supplies the coolant whose temperature is decreased to the cooler 174 while being circulated in the fourth line 171 in the vehicle cooling mode, through operation of the fourth water pump 172, cooling the interior of the vehicle.

In an exemplary embodiment of the present disclosure, an operation for recovering heat from the external heat source and for increasing the temperature of the battery module 122 in the heating mode of the vehicle will be described with reference to FIG. 4.

Figure 4:
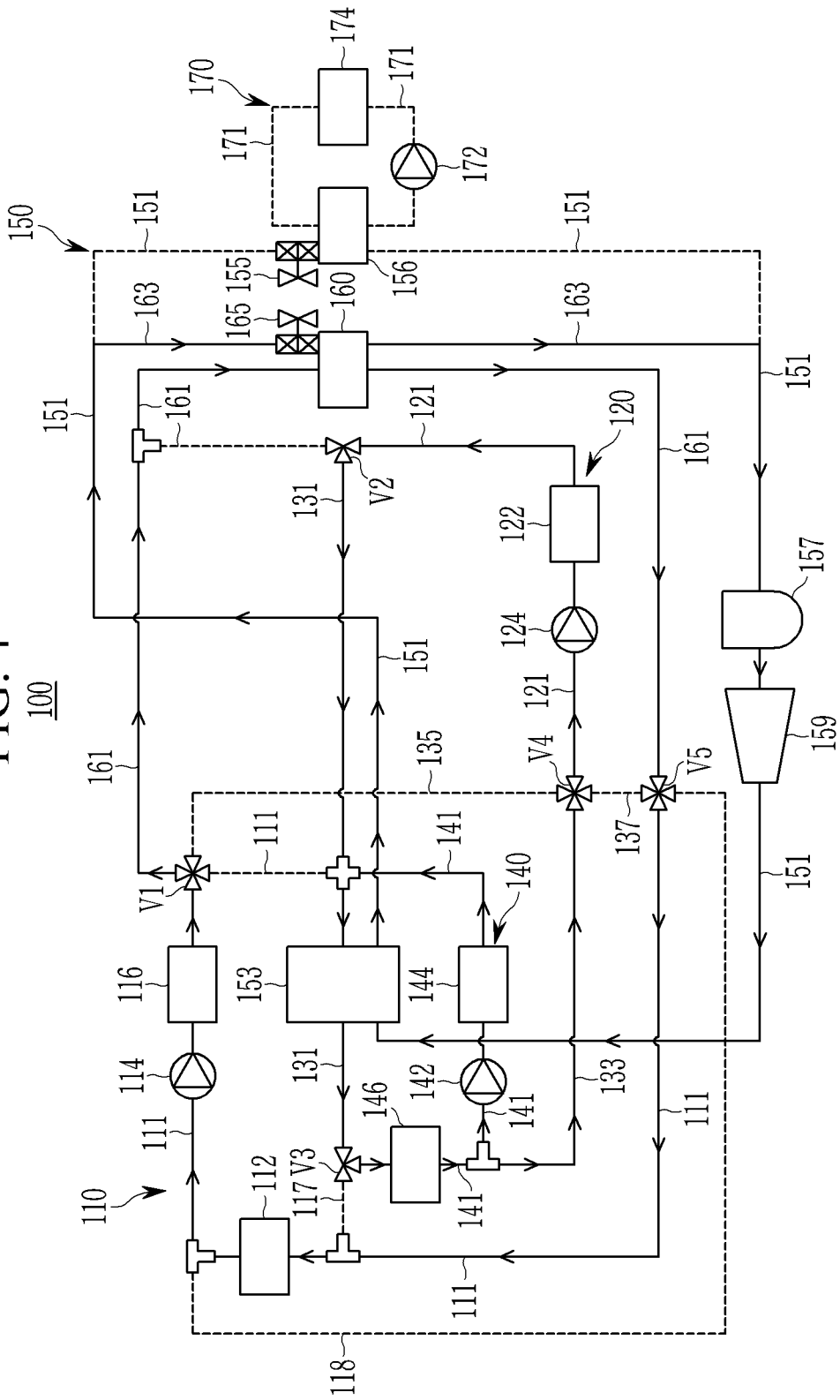
FIG. 4 illustrates an operational state diagram for recovery of heat from an external heat source and increasing a temperature of a battery module according to a heating mode in a heat pump system for a vehicle according to various exemplary embodiments of the present disclosure.

FIG. 4 illustrates an operational state diagram for recovery of heat from an external heat source and increasing of a temperature of a battery module according to a heating mode in a heat pump system for a vehicle according to various exemplary embodiments of the present disclosure.

Referring to FIG. 4, the heat pump system 100 may recover heat from an external heat source in the vehicle heating mode to use it for the indoor heating, and may increase the temperature of the battery module 122.

In present embodiment, in the electrical component cooling device 110 and the battery cooling device 120, the first and second water pumps 114 and 124 are operated, respectively.

Furthermore, in the indoor heating device 140, the third water pump 142 is operated.

First, the first line 111 is connected to the fifth line 161 by the operation of the first valve V1. At the same time, the first branch line 135 is closed.

Furthermore, a portion of the first line 111 connecting the first valve V1 and the sixth line 131 are closed by the operation of the first valve V1.

In a state in which the bypass line 118 is closed by the operation of the fifth valve V5, the first line 111 connected to the radiator 112 is opened.

Furthermore, the fifth line 161 may be connected to the first line 111 connected to the radiator 112 by the operation of the fifth valve V5.

Accordingly, the coolant that has passed through the electrical component 116 passes through the chiller 160 along the first line 111 and the fifth line 161 that are opened, and then it may recover heat from the heat source from the outside air while again passing through the radiator 112 along the opened first line 111.

Meanwhile, a portion of the fifth line 161 connected to the second valve V2 is closed by the operation of the second valve V2, and the second line 121 is connected to the sixth line 131 by the operation of the second valve V2.

Furthermore, the radiator connection line 117 is closed by the operation of the third valve V3, and simultaneously, the third line 141 is opened.

The supply line 133 is connected to the second line 121 by the operation of the fourth valve V4, and the second branch line 137 is closed by the operations of the fourth valve V4 and the fifth valve V5.

Accordingly, the coolant that has passed through the battery module 122 passes through the condenser 153 along the second line 121 and the sixth line 131 that are opened, and then it is supplied to the heater 144 along the opened third line 141.

Here, the coolant heater 146 may be operated when the temperature of the coolant circulating along the third line 141 is lower than the target temperature to heat the coolant circulating in the third line 141.

Meanwhile, the door is opened so that the outside air flowing into the HVAC module to pass through the cooler 174 passes through the heater 144.

Accordingly, the outside air flowing from the outside flows in the room temperature state in which it is not cooled when passing through the cooler 174 to which no low-temperature coolant is supplied. The flowed outside air is converted to a high-temperature state while passing through the heater 144 to flow into the vehicle interior, so that the vehicle interior may be heated.

That is, the heat pump system 100 according to the exemplary embodiment absorbs heat from an external heat source from the radiator 112 to use it for indoor heating of the vehicle, reducing power consumption of the compressor 59 and improving heating efficiency.

Meanwhile, the coolant that has passed through the heater 144 flows back to the condenser 153 along the third line 141 and the sixth line 131.

Furthermore, some of the coolant that has passed through the condenser 153 may be circulated while flowing back into the battery module 122 along the supply line 133 and the second line 121 that are opened.

Accordingly, the coolant whose temperature has increased while passing through the heater 144 and the condenser 153 flows into the battery module 122, so that the temperature of the battery module 122 may be increased.

Meanwhile, in the CE device 150, respective constituent elements may operate so that the refrigerant may be circulated along the refrigerant line 151 to heat the interior of the vehicle.

In the instant case, the first expansion valve 155 is not operated, while the second expansion valve 165 expands the refrigerant that has passed through the condenser 153 to supply it to the chiller 160. Accordingly, the supply of the refrigerant to the evaporator 156 is stopped.

Here, when dehumidification of the vehicle interior is required while the vehicle is in the heating mode, the first expansion valve 155 operates, so that the expanded refrigerant is supplied to the evaporator 156.

At the same time, in the indoor cooling device 170, the fourth water pump 172 is operated, and the coolant is circulated along the fourth line 171.

The coolant circulating along the fourth line 171 may flow into the cooler 174 while being cooled through heat exchange with the refrigerant in the evaporator 156.

That is, the outside air flowing into the HVAC module is dehumidified while passing through the cooler 174 by the low-temperature coolant flowing into the cooler 174. Accordingly, while passing through the heater 114, it is converted into a high-temperature state to flow into the interior of the vehicle, heating and dehumidifying the interior of the vehicle.

In an exemplary embodiment of the present disclosure, an operation for recovering the waste heat of the electrical component 116 and for increasing the temperature of the battery module 122 in the heating mode of the vehicle will be described with reference to FIG. 5.

Figure 5:
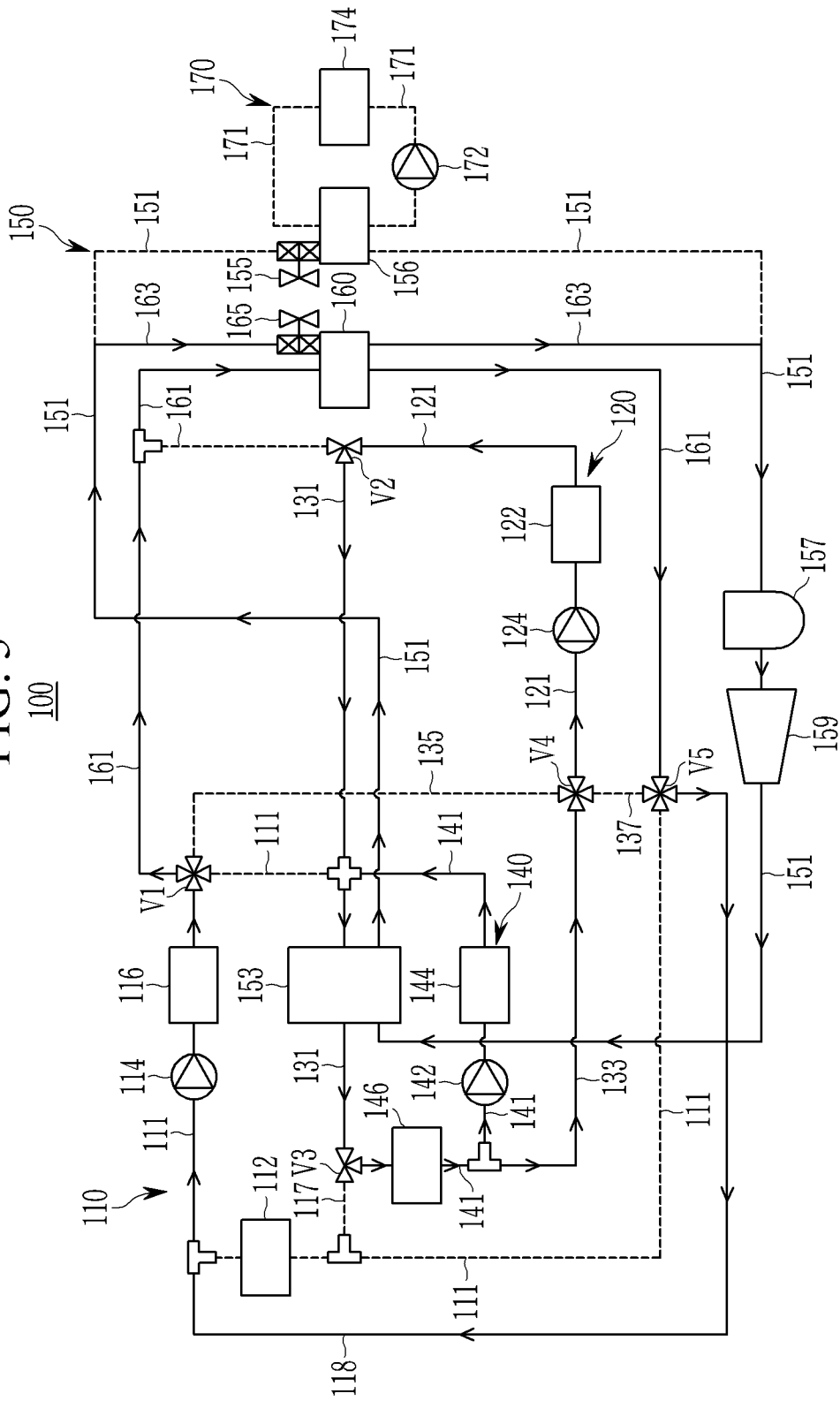
FIG. 5 illustrates an operational state diagram for waste heat recovery from an electrical component and increasing of a temperature of a battery module according to a heating mode in a heat pump system for a vehicle according to various exemplary embodiments of the present disclosure.

FIG. 5 illustrates an operational state diagram for waste heat recovery from an electrical component and increasing a temperature of a battery module according to a heating mode in a heat pump system for a vehicle according to various exemplary embodiments of the present disclosure.

Referring to FIG. 5, the heat pump system 100 may recover waste heat of the electrical component 116 in the vehicle heating mode to use it for the indoor heating, and may increase the temperature of the battery module 122.

In present embodiment, in the electrical component cooling device 110 and the battery cooling device 120, the first and second water pumps 114 and 124 are operated, respectively.

Furthermore, in the indoor heating device 140, the third water pump 142 is operated.

First, the first line 111 is connected to the fifth line 161 by the operation of the first valve V1. At the same time, the first branch line 135 is closed.

Furthermore, a portion of the first line 111 connecting the first valve V1 and the sixth line 131 are closed by the operation of the first valve V1.

In a state in which the first line 111 connected to the radiator is closed by the operation of the fifth valve V5, the bypass line 118 is opened.

Furthermore, the opened bypass line 118 may be connected to the fifth line 161 by the operation of the fifth valve V5.

Accordingly, the coolant that has passed through the electrical component 116 passes through the chiller 160 along the first line 111 and the fifth line 161 that are opened. Accordingly, the coolant passes through the electrical component 116 again without passing the radiator 112 along the fifth line 161 and the opened bypass line 118, and the temperature thereof may be increased by the waste heat of the electrical component 116.

That is, in the electrical component cooling device 110, the coolant recovers the waste heat generated from the electrical component 116 while circulating in the opened first line 111, the opened fifth line 161, and the bypass line 118, so that the temperature thereof is increased.

The coolant with the increased temperature may be supplied to the chiller 160 connected to the fifth line 161. Accordingly, the waste heat generated from the electrical component 116 increases the temperature of the refrigerant supplied to the chiller 160.

That is, while repeatedly performing the present operation, the coolant absorbs the waste heat from the electrical component 116, so that the temperature thereof may be increased.

Furthermore, while the coolant of which temperature has increased by absorbing the waste heat of the electrical component 116 passes through the chiller 160 through operation of the first water pump 114, it is recovered while increasing the temperature of the refrigerant supplied to the chiller 160.

Accordingly, the chiller 160 may increase the temperature of the refrigerant by heat-exchanging the coolant and the refrigerant to recover the waste heat from the coolant whose temperature has increased while passing through the electrical component 116.

That is, the chiller 160 receives the refrigerant which is expanded through operation of the second expansion valve 165, through the refrigerant connection line 163; and evaporates the supplied refrigerant through heat-exchange with the coolant of which temperature has increased while passing through the electrical component 116, recovering the waste heat from the electrical component 116.

Meanwhile, a portion of the fifth line 161 connected to the second valve V2 is closed by the operation of the second valve V2, and the second line 121 is connected to the sixth line 131 by the operation of the second valve V2.

Furthermore, the radiator connection line 117 is closed by the operation of the third valve V3, and simultaneously, the third line 141 is opened.

The supply line 133 is connected to the second line 121 by the operation of the fourth valve V4, and the second branch line 137 is closed by the operations of the fourth valve V4 and the fifth valve V5.

Accordingly, the coolant that has passed through the battery module 122 passes through the condenser 153 along the second line 121 and the sixth line 131 that are opened, and then it is supplied to the heater 144 along the opened third line 141.

Here, the coolant heater 146 may be operated when the temperature of the coolant circulating along the third line 141 is lower than the target temperature to heat the coolant circulating in the third line 141.

Meanwhile, the door is opened so that the outside air flowing into the HVAC module to pass through the cooler 174 passes through the heater 144.

Accordingly, the outside air flowing from the outside flows in the room temperature state in which it is not cooled when passing through the cooler 174 to which no low-temperature coolant is supplied. The flowed outside air is converted to a high-temperature state while passing through the heater 144 to flow into the vehicle interior, so that the vehicle interior may be heated.

That is, the heat pump system 100 according to the exemplary embodiment of the present disclosure recovers the waste heat generated from the electrical component 116 to use it for indoor heating of the vehicle, reducing power consumption of the compressor 59 and improving heating efficiency.

Meanwhile, the coolant that has passed through the heater 144 flows back to the condenser 153 along the third line 141 and the sixth line 131.

Furthermore, some of the coolant that has passed through the condenser 153 may be circulated while flowing back into the battery module 122 along the supply line 133 and the second line 121 that are opened.

Accordingly, the coolant whose temperature has increased while passing through the heater 144 and the condenser 153 flows into the battery module 122, so that the temperature of the battery module 122 may be increased.

Meanwhile, in the CE device 150, respective constituent elements may operate so that the refrigerant may be circulated along the refrigerant line 151 to heat the interior of the vehicle.

In the instant case, the first expansion valve 155 is not operated, while the second expansion valve 165 expands the refrigerant that has passed through the condenser 153 to supply it to the chiller 160. Accordingly, the supply of the refrigerant to the evaporator 156 is stopped.

Here, when dehumidification of the vehicle interior is required while the vehicle is in the heating mode, the first expansion valve 155 operates, so that the expanded refrigerant is supplied to the evaporator 156.

At the same time, in the indoor cooling device 170, the fourth water pump 172 is operated, and the coolant is circulated along the fourth line 171.

The coolant circulating along the fourth line 171 may flow into the cooler 174 while being cooled through heat exchange with the refrigerant in the evaporator 156.

That is, the outside air flowing into the HVAC module is dehumidified while passing through the cooler 174 by the low-temperature coolant flowing into the cooler 174. Accordingly, while passing through the heater 114, it is converted into a high-temperature state to flow into the interior of the vehicle, heating and dehumidifying the interior of the vehicle.

In an exemplary embodiment of the present disclosure, an operation for recovering heat from the external heat source and the waste heat of the battery module 122 in the heating mode of the vehicle will be described with reference to FIG. 6.

Figure 6:
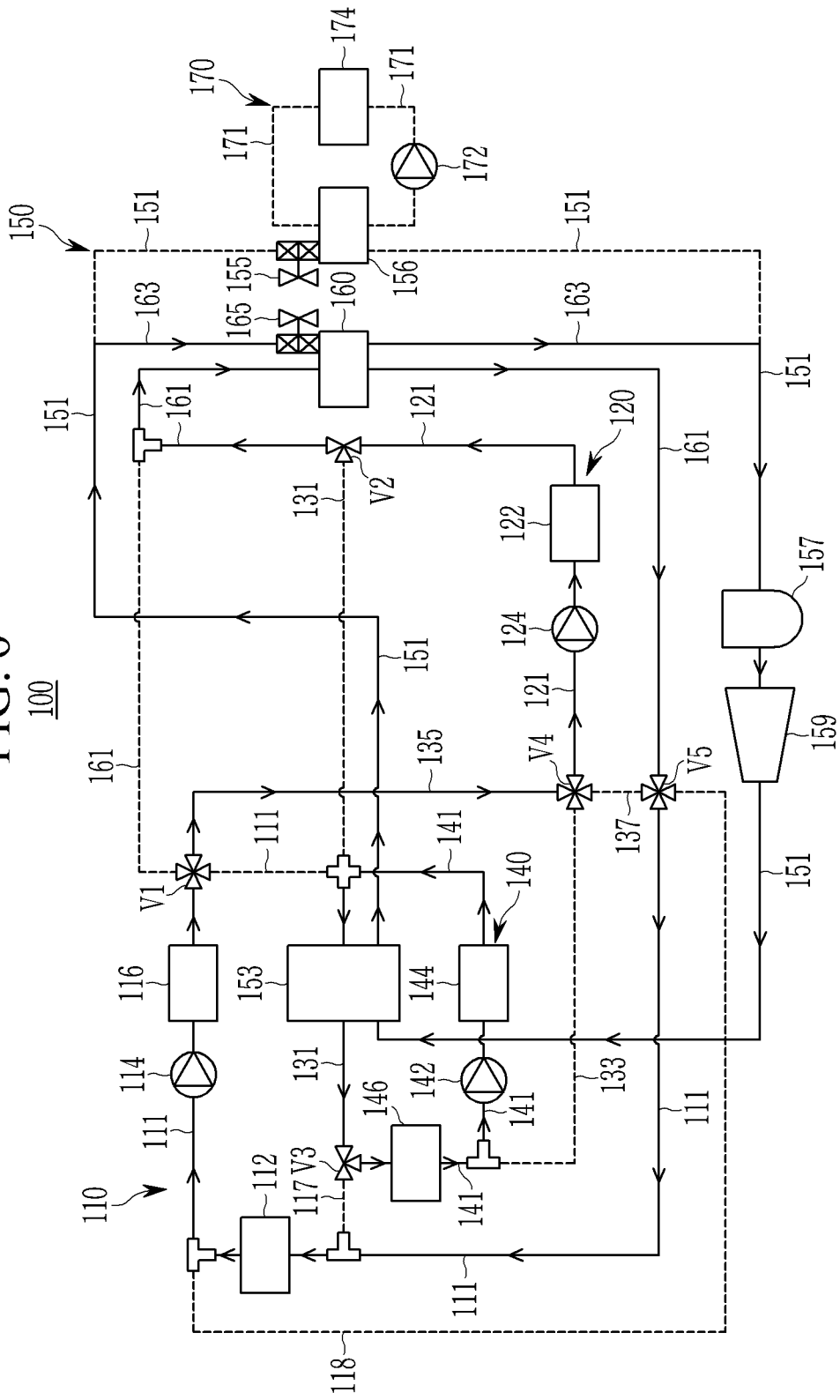
FIG. 6 illustrates an operational state diagram for an external heat source and waste heat recovery from a battery module according to a heating mode in a heat pump system for a vehicle according to various exemplary embodiments of the present disclosure.

FIG. 6 illustrates an operational state diagram for recovering heat from an external heat source and waste heat recovery from a battery module according to a heating mode in a heat pump system for a vehicle according to various exemplary embodiments of the present disclosure.

Referring to FIG. 6, the heat pump system 100 may be used for indoor heating by recovering heat from the external heat source and the waste heat of the battery module 122 in the vehicle heating mode.

In present embodiment, in the electrical component cooling device 110 and the battery cooling device 120, the first and second water pumps 114 and 124 are operated, respectively.

Furthermore, in the indoor heating device 140, the third water pump 142 is operated.

First, the fifth line 161 connected to the first line 111 is closed by the operation of the first valve V1. At the same time, the first branch line 135 is opened.

Furthermore, a portion of the first line 111 connecting the first valve V1 and the sixth line 131 are closed by the operation of the first valve V1.

The second line 121 connected to the battery module 122 is connected to the first branch line 135 by the operation of the fourth valve V4, and the supply line 133 is closed.

Meanwhile, the second line 121 is connected to the fifth line 161 by the operation of the second valve V2. Furthermore, a portion of the sixth line 131 connected to the second line 121 is closed by the operation of the second valve V2.

In a state in which the bypass line 118 is closed by the operation of the fifth valve V5, the first line 111 connected to the radiator 112 is opened.

In an exemplary embodiment of the present disclosure, the fifth line 161 is connected to the first line 111 connected to the radiator 112 by the operation of the fifth valve V5.

Furthermore, the second branch line 137 is closed by the operations of the fourth valve V4 and the fifth valve V5.

Accordingly, the coolant that has passed through the electrical component 116 may sequentially pass through the battery module 122 and the chiller 160 along the first line 111, the first branch line 135, the second line 121, and the fifth line 161 that are opened.

Accordingly, the coolant that has passed through the chiller 160 may recover heat from the heat source from the outside air while again passing through the radiator 112 along the fifth line 161 and the first line 111 that are opened.

That is, the coolant may recover heat from the heat source of the outside air from the radiator 112 and at the same time absorb the waste heat of the battery module 122 to be heated, while circulating along the first line 111, the first branch line 135, the second line 121, and the fifth line 161 that are opened by the operations of the first and second water pumps 114 and 124.

Furthermore, while the coolant whose temperature is increased by absorbing heat from the external heat source and the waste heat of the battery module 122 passes through the chiller 160 through the operations of the first and second water pumps 114 and 124, it is recovered while increasing the temperature of the refrigerant supplied to the chiller 160.

Accordingly, the chiller 160 may increase the temperature of the refrigerant by heat-exchanging the coolant and the refrigerant to recover the waste heat from the coolant whose temperature has increased.

That is, the chiller 160 is supplied with the refrigerant which is expanded through operation of the second expansion valve 165, through the refrigerant connection line 163, and it evaporates the supplied refrigerant by heat-exchanging the supplied refrigerant with the coolant whose temperature is increased by recovering heat from the external heat source and the waste heat of the battery module 122, recovering heat from the external heat source and the waste heat of the battery module 116.

Meanwhile, in an exemplary embodiment of the present disclosure, in a state in which the radiator connection line 117 is closed by the operation of the third valve V3, the third line 141 may be opened.

Accordingly, the coolant that has passed through the condenser 153 along the opened sixth line 131 may be supplied to the heater 144 along the third line 141.

Here, the coolant heater 146 may be operated when the temperature of the coolant circulating along the third line 141 is lower than the target temperature to heat the coolant circulating in the third line 141.

Meanwhile, the door is opened so that the outside air flowing into the HVAC module to pass through the cooler 174 passes through the heater 144.

Accordingly, the outside air flowing from the outside flows in the room temperature state in which it is not cooled when passing through the cooler 174 to which no low-temperature coolant is supplied. The flowed outside air is converted to a high-temperature state while passing through the heater 144 to flow into the vehicle interior, so that the vehicle interior may be heated.

That is, the heat pump system 100 according to the exemplary embodiment of the present disclosure recovers heat from the external heat source and the waste heat generated from the battery module 122 to use it for indoor heating of the vehicle, reducing power consumption of the compressor 59 and improving heating efficiency.

Furthermore, the coolant that has passed through the heater 144 passes through the condenser 153 along the sixth line 131 connected to the third line 141 and then circulates along the third line 141 and the sixth line 131 while being discharged back to the third line 141.

By repeatedly performing these operations, the interior of the vehicle may be heated.

Meanwhile, in the CE device 150, respective constituent elements may operate so that the refrigerant may be circulated along the refrigerant line 151 to heat the interior of the vehicle.

In the instant case, the first expansion valve 155 is not operated, while the second expansion valve 165 expands the refrigerant that has passed through the condenser 153 to supply it to the chiller 160. Accordingly, the supply of the refrigerant to the evaporator 156 is stopped.

Here, when dehumidification of the vehicle interior is required while the vehicle is in the heating mode, the first expansion valve 155 operates, so that the expanded refrigerant is supplied to the evaporator 156.

At the same time, in the indoor cooling device 170, the fourth water pump 172 is operated, and the coolant is circulated along the fourth line 171.

The coolant circulating along the fourth line 171 may flow into the cooler 174 while being cooled through heat exchange with the refrigerant in the evaporator 156.

That is, the outside air flowing into the HVAC module is dehumidified while passing through the cooler 174 by the low-temperature coolant flowing into the cooler 174. Accordingly, while passing through the heater 114, it is converted into a high-temperature state to flow into the interior of the vehicle, heating and dehumidifying the interior of the vehicle.

Furthermore, an operation for recovering the waste heat of the electrical component 116 and the battery module 122 in the heating mode of the vehicle will be described with reference to FIG. 7.

Figure 7:
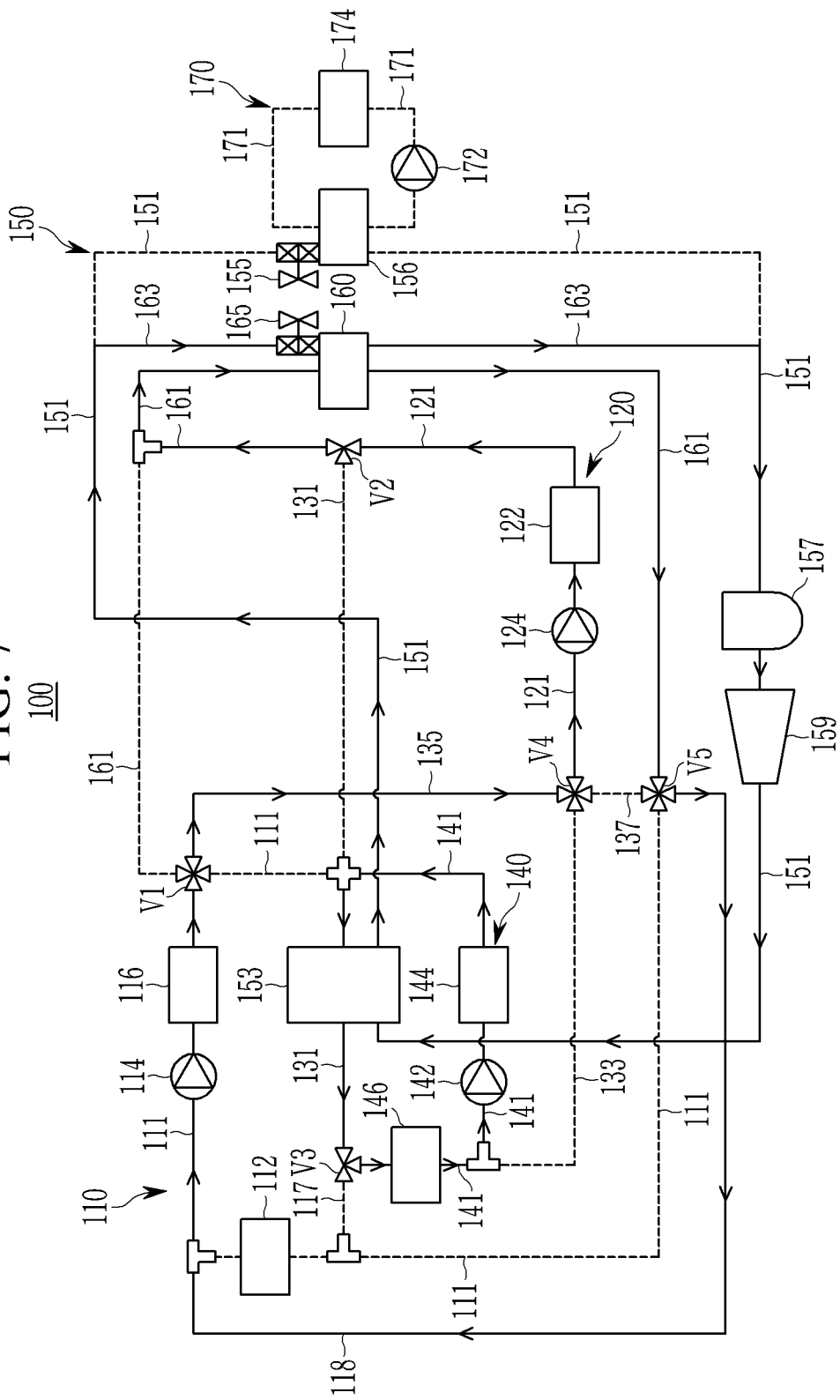
FIG. 7 illustrates an operational state diagram for waste heat recovery from an electrical component and a battery module according to a heating mode in a heat pump system for a vehicle according to various exemplary embodiments of the present disclosure.

FIG. 7 illustrates an operational state diagram for waste heat recovery from an electrical component and a battery module according to a heating mode in a heat pump system for a vehicle according to various exemplary embodiments of the present disclosure.

Referring to FIG. 7, the heat pump system 100 may be used for indoor heating by recovering the waste heat of the electrical component 116 and the battery module 122 in the vehicle heating mode.

In present embodiment, in the electrical component cooling device 110 and the battery cooling device 120, the first and second water pumps 114 and 124 are operated, respectively.

Furthermore, in the indoor heating device 140, the third water pump 142 is operated.

First, the fifth line 161 connected to the first line 111 is closed by the operation of the first valve V1. At the same time, the first branch line 135 is opened.

Furthermore, a portion of the first line 111 connecting the first valve V1 and the sixth line 131 are closed by the operation of the first valve V1.

The second line 121 connected to the battery module 122 is connected to the first branch line 135 by the operation of the fourth valve V4, and the supply line 133 is closed.

Meanwhile, the second line 121 is connected to the fifth line 161 by the operation of the second valve V2. Furthermore, a portion of the sixth line 131 connected to the second line 121 is closed by the operation of the second valve V2.

In a state in which the first line 111 connected to the radiator is closed by the operation of the fifth valve V5, the bypass line 118 is opened.

Furthermore, the opened bypass line 118 may be connected to the fifth line 161 by the operation of the fifth valve V5.

Furthermore, the second branch line 137 is closed by the operations of the fourth valve V4 and the fifth valve V5.

Accordingly, the coolant that has passed through the electrical component 116 may sequentially pass through the battery module 122 and the chiller 160 along the first line 111, the first branch line 135, the second line 121, and the fifth line 161 that are opened.

After that, the coolant that has passed through the chiller 160 passes through the electrical component 116 and the battery module 122 again without passing the radiator 112 along the opened bypass line 118, and thus, it may be heated by the waste heat of the electrical component 116 and the battery module 122.

That is, in the electrical component cooling device 110 and the battery cooling device 120, while the coolant circulates along the first line 111, the first branch line 135, the second line 121, the fifth line 161, and the bypass line 118 that are opened, it may recover the waste heat generated from the electrical component 116 and the battery module 122 and may be heated.

The heated coolant may be supplied to the chiller 160 connected to the fifth line 161. Accordingly, the waste heat generated from the electrical component 116 and the battery module 122 increases the temperature of the coolant supplied to the chiller 160.

That is, while repeatedly performing these operations, the coolant may be heated by absorbing the waste heat from the electrical component 116 and the battery module 122.

Furthermore, while the coolant heated by absorbing the waste heat of the electrical component 116 and the battery module 122 passes through the chiller 160 through the operations of the first and second water pumps 114 and 124, it is recovered while increasing the temperature of the refrigerant supplied to the chiller 160.

Accordingly, the chiller 160 may increase the temperature of the refrigerant by heat-exchanging the coolant and the refrigerant to recover the waste heat from the coolant heated while passing through the electrical component 116 and the battery module 122.

That is, the chiller 160 receives the refrigerant which is expanded through operation of the second expansion valve 165, through the refrigerant connection line 163, and evaporates the supplied refrigerant through heat-exchange with the coolant heated while passing through the electrical component 116, recovering the waste heat from the electrical component 116 and the battery module 122.

Meanwhile, in an exemplary embodiment of the present disclosure, in a state in which the radiator connection line 117 is closed by the operation of the third valve V3, the third line 141 may be opened.

Accordingly, the coolant that has passed through the condenser 153 along the opened sixth line 131 may be supplied to the heater 144 along the third line 141.

Here, the coolant heater 146 may be operated when the temperature of the coolant circulating along the third line 141 is lower than the target temperature to heat the coolant circulating in the third line 141.

Meanwhile, the door is opened so that the outside air flowing into the HVAC module to pass through the cooler 174 passes through the heater 144.

Accordingly, the outside air flowing from the outside flows in the room temperature state in which it is not cooled when passing through the cooler 174 to which no low-temperature coolant is supplied. The flowed outside air is converted to a high-temperature state while passing through the heater 144 to flow into the vehicle interior, so that the vehicle interior may be heated.

That is, the heat pump system 100 according to the exemplary embodiment of the present disclosure recovers the waste heat generated from the electrical component 116 and the battery module 122 to use it for indoor heating of the vehicle, reducing power consumption of the compressor 59 and improving heating efficiency.

Furthermore, the coolant that has passed through the heater 144 passes through the condenser 153 along the sixth line 131 connected to the third line 141 and then circulates along the third line 141 and the sixth line 131 while being discharged back to the third line 141.

By repeatedly performing these operations, the interior of the vehicle may be heated.

Meanwhile, in the CE device 150, respective constituent elements may operate so that the refrigerant may be circulated along the refrigerant line 151 to heat the interior of the vehicle.

In the instant case, the first expansion valve 155 is not operated, while the second expansion valve 165 expands the refrigerant that has passed through the condenser 153 to supply it to the chiller 160. Accordingly, the supply of the refrigerant to the evaporator 156 is stopped.

Here, when dehumidification of the vehicle interior is required while the vehicle is in the heating mode, the first expansion valve 155 operates, so that the expanded refrigerant is supplied to the evaporator 156.

At the same time, in the indoor cooling device 170, the fourth water pump 172 is operated, and the coolant is circulated along the fourth line 171.

The coolant circulating along the fourth line 171 may flow into the cooler 174 while being cooled through heat exchange with the refrigerant in the evaporator 156.

That is, the outside air flowing into the HVAC module is dehumidified while passing through the cooler 174 by the low-temperature coolant flowing into the cooler 174. Accordingly, while passing through the heater 114, it is converted into a high-temperature state to flow into the interior of the vehicle, heating and dehumidifying the interior of the vehicle.

Accordingly, when the vehicle heat pump system 100 according to the exemplary embodiment of the present disclosure is applied as described above, by use of the chiller 160 in which the coolant and the refrigerant are heat-exchanged in the electric vehicle, it is possible to control the temperature of the battery module 122 according to the vehicle mode and thus to simplify the system.

Furthermore, according to the exemplary embodiment of the present disclosure, it is possible to improve heating efficiency by selectively recovering heat from the external heat source, or the waste heat generated from the electrical component 116 or the battery module, in the heating mode of the vehicle to use it for indoor heating.

Furthermore, according to an exemplary embodiment of the present disclosure, by selectively heat-exchanging thermal energy generated from a refrigerant during condensation and evaporation of the refrigerant with a coolant, and by controlling an indoor temperature of a vehicle by respectively using the heat-exchanged low- or high-temperature coolant, it is possible to simplify a system and simplify a layout of a connecting pipe through which the refrigerant is circulated.

Furthermore, according to an exemplary embodiment of the present disclosure, the battery module 122 may operate in an optimum performance state by efficiently controlling the temperature of the battery module 122, and the total traveling distance of the vehicle may be increased through the efficient management of the battery module 122.

Furthermore, according to an exemplary embodiment of the present disclosure, by modularizing the centralized energy device 150 that generates the thermal energy through the condensation and evaporation of the refrigerant, and by use of the high-performance refrigerant, it is possible to reduce the size and weight thereof, and it is possible to further prevent noise, vibration, and operational instability from occurring compared to conventional air conditioners.

Furthermore, according to an exemplary embodiment of the present disclosure, the coolant heater 146 applied to the indoor heating device 140 may be used as an auxiliary device for indoor heating, reducing cost and weight.

Furthermore, according to an exemplary embodiment of the present disclosure, it is possible to reduce the manufacturing cost and weight through simplification of the entire system, and may improve space utilization.

In various exemplary embodiments of the present disclosure, a controller is connected to at least one of the elements of the heat pump system 100 such as first, second, third, fourth, and fifth valves V1, V2, V3, V4, and V5 but not limited thereto, to control the operations thereof.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A heat pump system for a vehicle, the heat pump system comprising:
    an electrical component cooling device including a radiator and a first water pump that are provided in a first line, and circulating a coolant in the first line to cool at least one electrical component provided in the first line;
    a battery cooling device including a second water pump and a battery module that are provided in a second line, and circulating a coolant in the battery module;
    an indoor heating device including a third water pump and a heater that are provided in a third line to heat a vehicle interior by use of a high-temperature coolant;
    an indoor cooling device including a fourth water pump and a cooler that are interconnected through a fourth line to cool the vehicle interior by use of a low-temperature coolant;
    a centralized energy (CE) device in which, to supply a high-temperature coolant to the indoor heating device and a low-temperature coolant to the indoor cooling device, thermal energy generated during condensation and evaporation of a refrigerant circulating in a refrigerant line is exchanged with an introduced coolant to control a temperature of the coolant;
    a chiller which is connected to a refrigerant connection line connected to the refrigerant line, is provided in a fifth line connected to the first line and the second line through a first valve and a second valve, respectively, and controls a temperature of the coolant by heat-exchanging a selectively introduced coolant with the refrigerant;
    a supply line in which a first end portion thereof is connected to the third line and a second end portion thereof is selectively connectable to the second line through a fourth valve;
    a fifth valve provided between the first line and the fifth line so that the fifth line and the first line that are connected to the chiller are selectively connectable via operation of the fifth valve;
    a bypass line selectively connecting the first line connected to the first water pump through an operation of the fifth valve so that the coolant circulates to the at least one electrical component without passing through the radiator;
a first branch line selectively connecting the first valve and the fourth valve; and
a second branch line selectively connecting the fourth valve and the fifth valve,
wherein a condenser included in the centralized energy device is connected to the second line through the second valve to condense the refrigerant supplied through the refrigerant line through heat-exchange with the coolant and is provided in a sixth line through which the coolant flows, and
wherein a first end portion of the third line is connected to a third valve provided in the sixth line.

2. The heat pump system for the vehicle of claim 1, wherein the centralized energy device includes:
a first expansion valve connected to the condenser and the refrigerant line;
an evaporator which is connected to the first expansion valve through the refrigerant line, is connected to the fourth line, and evaporates the refrigerant through heat-exchange of the refrigerant and the coolant and simultaneously decreases a temperature of the coolant;
a compressor provided in the refrigerant line between the evaporator and the condenser; and
an accumulator provided in the refrigerant line between the evaporator and the compressor,
wherein a first end portion of the refrigerant connection line is connected to the refrigerant line between the condenser and the first expansion valve, and
wherein a second end portion of the refrigerant connection line is connected to the refrigerant line between the evaporator and the accumulator.

3. The heat pump system for the vehicle of claim 2,
wherein the first line is selectively connectable to the sixth line through the first valve,
wherein a second end portion of the third line is connected to the sixth line at a position at which the first line and the sixth line cross, and
wherein the first line connected to the radiator is connected to the third valve through a radiator connection line connecting the first line and the third valve.

4. The heat pump system for the vehicle of claim 3, wherein
when the battery module is cooled in a cooling mode of the vehicle,
in the electrical component cooling device, the first water pump is operated;
the first branch line is closed by operation of the first valve, and the first line connected to the sixth line is opened;
the sixth line and the radiator connection line are opened by operation of the third valve, and the third line is closed;
the coolant circulates through the radiator, the at least one electrical component, and the condenser along the opened first line, a portion of the sixth line, and the radiator connection line;
in the battery cooling device, the second water pump is operated;
the second line and the fifth line are connected by operation of the second valve, and a portion of the sixth line connected to the second valve is closed;
the first branch line is closed by operation of the first valve and the fourth valve;
the second branch line is opened by operations of the fourth valve and the fifth valve;
the coolant that has passed through the battery module passes through the chiller along the fifth line from the second line, and then circulates along the second line, the fifth line, and the second branch line that are opened while flowing back into the second line through the second branch line;
in the centralized energy device, each constituent element thereof operates so that a refrigerant circulates along the refrigerant line; and
in the indoor cooling device, the fourth water pump is operated so that a coolant is circulated along the fourth line connecting the evaporator and the cooler to supply the coolant that has passed through the evaporator provided in the centralized energy device to the cooler.

5. The heat pump system for the vehicle of claim 3, wherein
when the at least one electrical component and the battery module are cooled by use of a coolant cooled in the radiator in a cooling mode of the vehicle,
in the electrical component cooling device and the battery cooling device, the first and second water pumps are operated, respectively;
a portion of the first line connecting the first valve and the sixth line is closed by operation of the first valve;
the fifth line is closed, and simultaneously, the first branch line is opened, by operation of the first valve;
the second line connected to the battery module is connected to the first branch line, and the supply line is closed, by operation of the fourth valve;
in a state in which the fifth line is closed by operation of the second valve, the sixth line is opened;
in a state in which the third line is closed by operation of the third valve, the radiator connection line is connected to the first line connected to the radiator;
a coolant cooled in the radiator sequentially passes through the at least one electrical component, the battery module, and the condenser along the first line, the first branch line, the second line, the sixth line, and the radiator connection line that are opened to flow into the radiator;
in the centralized energy device, each constituent element thereof operates so that a refrigerant circulates along the refrigerant line; and
in the indoor cooling device, the fourth water pump is operated so that a coolant is circulated along the second connection line connecting the evaporator and the cooler to supply the coolant that has passed through the evaporator provided in the centralized energy device to the cooler.

6. The heat pump system for the vehicle of claim 3, wherein
when recovering heat from an external heat source and increasing a temperature of the battery module in a heating mode of the vehicle,
in the electrical component cooling device and the battery cooling device, the first and second water pumps are operated, respectively;
in the indoor heating device, the third water pump is operated;
the first line is connected to the fifth line and the first branch line is closed by operation of the first valve;
a portion of the first line connecting the first valve and the sixth line is closed by operation of the first valve;

in a state in which the bypass line is closed by operation of the fifth valve, the first line connected to the radiator is opened, and the fifth line and the first line are connected;
the coolant that has passed the at least one electrical component passes through the chiller along the first line and the fifth line that are opened, and then recovers heat from a heat source from outside air while passing through the radiator along the opened first line again;
the fifth line connected to the second valve is closed and the second line is connected to the sixth line through the second valve by operation of the second valve;
in a state in which the radiator connection line is closed by operation of the third valve, the third line is opened;
the supply line and the second line are connected by operation of the fourth valve;
the second branch line is closed by operations of the fourth valve and the fifth valve;
a coolant that has passed through the battery module passes through the condenser along the second line and the sixth line that are opened, and then is supplied to the heater along the opened third line;
a coolant that has passed through the heater flows back into the condenser along the third line and the sixth line;
some of the coolant that has passed through the condenser is circulated while flowing back into the battery module along the supply line and the second line that are opened; and
in the centralized energy device, each constituent element thereof operates so that a refrigerant circulates along the refrigerant line.

7. The heat pump system for the vehicle of claim 3, wherein
when recovering waste heat of the at least one electrical component and increasing a temperature of the battery module in a heating mode of the vehicle,
in the electrical component cooling device and the battery cooling device, the first and second water pumps are operated, respectively;
in the indoor heating device, the third water pump is operated;
the first line is connected to the fifth line and the first branch line is closed by operation of the first valve;
a portion of the first line connecting the first valve and the sixth line is closed by operation of the first valve;
in a state in which the first line connected to the radiator closed by operation of the fifth valve, the bypass line is opened;
the fifth line and the opened bypass line are connected by operation of the fifth valve;
a coolant that has passed through the at least one electrical component passes through the chiller along the first line and the fifth line that are opened, and then is heated by waste heat of the at least one electrical component while passing through the at least one electrical component without passing through the radiator along the opened bypass line;
the fifth line connected to the second valve is closed and the second line is connected to the sixth line through the second valve by operation of the second valve;
in a state in which the radiator connection line is closed by operation of the third valve, the third line is opened;
the supply line and the second line are connected by operation of the fourth valve;
the second branch line is closed by operations of the fourth valve and the fifth valve;
a coolant that has passed through the battery module passes through the condenser along the second line and the sixth line that are opened, and then is supplied to the heater along the opened third line;
a coolant that has passed through the heater flows back into the condenser along the third line and the sixth line;
some of the coolant that has passed through the condenser is circulated while flowing back into the battery module along the supply line and the second line that are opened; and
in the centralized energy device, each constituent element thereof operates so that a refrigerant circulates along the refrigerant line.

8. The heat pump system for the vehicle of claim 7, wherein the chiller increases a temperature of a coolant by heat-exchanging a coolant and a refrigerant to recover waste heat from the coolant heated while passing through the at least one electrical component.

9. The heat pump system for the vehicle of claim 3, wherein
when recovering heat from an external heat source and recovering waste heat of the battery module in a heating mode of the vehicle,
in the electrical component cooling device and the battery cooling device, the first and second water pumps are operated, respectively;
in the indoor heating device, the third water pump is operated;
the fifth line connected to the first line is closed and the first branch line is opened by operation of the first valve;
a portion of the first line connecting the first valve and the sixth line is closed by operation of the first valve;
the second line connected to the battery module is connected to the first branch line, and the supply line is closed, by operation of the fourth valve;
the second line is connected to the fifth line and a portion of the sixth line connected to the second line is closed by operation of the second valve;
in a state in which the bypass line is closed by operation of the fifth valve, the first line connected to the radiator is opened, and the fifth line and the first line are connected;
the second branch line is closed by operations of the fourth valve and the fifth valve;
a coolant that has passed through the at least one electrical component sequentially passes through the battery module and the chiller along the first line, the first branch line, the second line, and the fifth line that are opened, and then recovers heat from a heat source from outside air while again passing through the radiator along the opened first line;
in a state in which the radiator connection line is closed by operation of the third valve, the third line is opened;
a coolant that has passed through the condenser along the opened sixth line is supplied to the heater along the third line;
a coolant that has passed through the heater is circulated while flowing back into the condenser along the third line and the opened sixth line; and
in the centralized energy device, each constituent element thereof operates so that a refrigerant circulates along the refrigerant line.

10. The heat pump system for the vehicle of claim 3, wherein when recovering waste heat of the at least one electrical component and the battery module in a heating mode of the vehicle,
in the electrical component cooling device and the battery cooling device, the first and second water pumps are operated, respectively;
in the indoor heating device, the third water pump is operated;
the fifth line connected to the first line is closed and the first branch line is opened by operation of the first valve;
a portion of the first line connecting the first valve and the sixth line is closed by operation of the first valve;
the second line connected to the battery module is connected to the first branch line, and the supply line is closed, by operation of the fourth valve;
the second line is connected to the fifth line and a portion of the sixth line connected to the second line is closed by operation of the second valve;
in a state in which the first line connected to the radiator closed by operation of the fifth valve, the bypass line is opened;
the fifth line and the opened bypass line are connected by operation of the fifth valve;
the second branch line is closed by operations of the fourth valve and the fifth valve;
a coolant that has passed through the at least one electrical component passes through the chiller along the first line, the first branch line, the second line, and the fifth line that are opened, and then is heated by the waste heat of the at least one electrical component and the battery module while passing through the at least one electrical component and the battery module without passing through the radiator along the opened bypass line;
in a state in which the radiator connection line is closed by operation of the third valve, the third line is opened;
a coolant that has passed through the condenser along the opened sixth line is supplied to the heater along the third line;
a coolant that has passed through the heater is circulated while flowing back into the condenser along the third line and the opened sixth line; and
in the centralized energy device, each constituent element thereof operates so that a refrigerant circulates along the refrigerant line.

11. The heat pump system for the vehicle of claim 3, wherein the first, fourth, and fifth valves are four-way valves, and the second and third valves are three-way valves.

12. The heat pump system for the vehicle of claim 2, wherein at a front end portion of the chiller, the refrigerant connection line is provided with a second expansion valve to control flow of the refrigerant flowing into the chiller and to selectively expand the refrigerant.

13. The heat pump system for the vehicle of claim 12, wherein the second expansion valve expands the refrigerant flowing into the refrigerant connection line to flow the refrigerant into the chiller, when cooling the battery module by use of a coolant heat-exchanged with the refrigerant or when selectively recovering waste heat from the at least one electrical component and the battery module.

14. The heat pump system for the vehicle of claim 12, wherein the first expansion valve and the second expansion valve are electronic expansion valves that selectively expand a refrigerant while controlling flow of the refrigerant.

15. The heat pump system for the vehicle of claim 2, wherein when dehumidification is required in a heating mode of the vehicle, the fourth water pump provided in the indoor cooling device is operated, and a refrigerant is supplied to the evaporator in the centralized energy device.

16. The heat pump system for the vehicle of claim 1, wherein the indoor heating device further includes a coolant heater provided in the third line between the third valve and the third water pump.

17. The heat pump system for the vehicle of claim 16, wherein the coolant heater is operated when a temperature of a coolant supplied to the heater in a heating mode of the vehicle is lower than a target temperature or when the battery module is heated.

18. The heat pump system for the vehicle of claim 1, wherein the chiller recovers waste heat generated from the at least one electrical component or the battery module or controls a temperature of the battery module, according to a cooling mode or a heating mode of the vehicle.

* * * * *